United States Patent
Lang et al.

(10) Patent No.: US 9,054,351 B2
(45) Date of Patent: Jun. 9, 2015

(54) SYSTEM AND METHOD FOR COOLING A FUEL CELL-POWERED VEHICLE

(71) Applicant: GM Global Technology Operations LLC, Detroit, MI (US)

(72) Inventors: Matthew A. Lang, Churchville, NY (US); Steven R. Falta, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 13/757,071

(22) Filed: Feb. 1, 2013

(65) Prior Publication Data

US 2014/0220468 A1    Aug. 7, 2014

(51) Int. Cl.
*H01M 8/04* (2006.01)

(52) U.S. Cl.
CPC ...... *H01M 8/04029* (2013.01); *H01M 8/04104* (2013.01); *H01M 8/04067* (2013.01); *H01M 8/04* (2013.01); *H01M 8/04007* (2013.01); *H01M 2250/20* (2013.01); *Y02E 60/50* (2013.01); *Y02T 90/32* (2013.01)

(58) Field of Classification Search
CPC .............. H01M 8/04; H01M 8/04007; H01M 8/04029; H01M 8/04067; H01M 8/04104
USPC .......................................................... 429/436
See application file for complete search history.

(56) References Cited

U.S. PATENT DOCUMENTS

| | | | |
|---|---|---|---|
| 5,503,944 A * | 4/1996 | Meyer et al. ................... | 429/437 |
| 5,776,624 A | 7/1998 | Neutzler | |
| 2004/0142217 A1 * | 7/2004 | Couch et al. .................... | 429/13 |
| 2005/0067012 A1 * | 3/2005 | Gridley ........................ | 137/236.1 |
| 2009/0035616 A1 * | 2/2009 | Darling et al. ................... | 429/13 |
| 2009/0317678 A1 * | 12/2009 | Bono .............................. | 429/24 |
| 2010/0167140 A1 * | 7/2010 | Balliet .......................... | 429/428 |

* cited by examiner

*Primary Examiner* — Jonathan Jelsma
(74) *Attorney, Agent, or Firm* — Dinsmore & Shohl LLP (57) ABSTRACT

A fuel cell system, including a plurality of bipolar plate assemblies, each assembly including a first plate and a second plate with an internal coolant flow path disposed therebetween, a flow path for a first reactant gas on a side of the first plate opposite the internal coolant flow path, and a flow path for a second reactant gas on a side of the second plate opposite the internal coolant flow path, and a cooling system configured to place coolant in thermal communication with the plurality of bipolar plate assemblies, wherein cycling pressure differentials between the internal coolant flow path and the external reactant gas flow paths cause expansion and contraction of a volume of coolant disposed within the bipolar plate assembly, thereby pumping coolant through the cooling system. A method of cooling a fuel cell-powered vehicle is also provided.

18 Claims, 4 Drawing Sheets

SYSTEM AND METHOD FOR COOLING A FUEL CELL-POWERED VEHICLE

BACKGROUND OF THE INVENTION

The present invention relates generally to an apparatus for a hydrogen fueled vehicle. Even more particularly, the present invention relates to a hydrogen fueled vehicle that employs expansion and contraction of a volume of coolant within a bipolar plate assembly to pump coolant throughout a cooling system in the event of a coolant pump failure.

Electrochemical conversion cells, commonly referred to as fuel cells, produce electrical energy by processing reactants, for example, through the oxidation of hydrogen with oxygen in air. Electric power is provided to an electric motor for vehicle propulsion. The only byproducts produced by such a system are pure water and off-heat. The off heat is generally rejected to the environment by virtue of a liquid coolant loop and a typical automotive radiator. Hydrogen is a very attractive fuel because it is clean and it can be used to produce electricity efficiently in a fuel cell. The automotive industry has expended significant resources in the development of hydrogen fuel cells as a source of power for vehicles. Vehicles powered by hydrogen fuel cells would be more efficient and generate fewer emissions than today's vehicles employing internal combustion engines.

In a typical fuel cell system, hydrogen or a hydrogen-rich gas is supplied as a reactant through a flow path to the anode side of a fuel cell while oxygen (such as in the form of atmospheric oxygen) is supplied as a reactant through a separate flow path to the cathode side of the fuel cell. Catalysts, typically in the form of a noble metal such as platinum, are placed at the anode and cathode to facilitate the electrochemical conversion of the reactants into electrons and positively charged ions (for the hydrogen) and negatively charged ions (for the oxygen). In one well-known fuel cell form, the anode and cathode may be made from a layer of electrically-conductive gaseous diffusion media (GDM) material onto which the catalysts are deposited to form a catalyst coated diffusion media (CCDM). An electrolyte layer separates the anode from the cathode to allow the selective passage of ions to pass from the anode to the cathode while simultaneously prohibiting the passage of the generated electrons, which instead are forced to flow through an external electrically-conductive circuit (such as a load) to perform useful work before recombining with the charged ions at the cathode. The combination of the positively and negatively charged ions at the cathode results in the production of non-polluting water as a byproduct of the reaction. In another well-known fuel cell form, the anode and cathode may be formed directly on the electrolyte layer to form a layered structure known as a membrane electrode assembly (MEA).

One type of fuel cell, called the proton exchange membrane (PEM) fuel cell, has shown particular promise for vehicular and related mobile applications. The electrolyte layer of a PEM fuel cell is in the form of a solid proton-transmissive membrane (such as a perfluorosulfonic acid membrane, a commercial example of which is Nafion™). Regardless of whether either of the above MEA-based approach or CCDM-based approach is employed, the presence of an anode separated from a cathode by an electrolyte layer forms a single PEM fuel cell; many such single cells can be combined to form a fuel cell stack, increasing the power output thereof. Multiple stacks can be coupled together to further increase power output.

In a fuel cell stack, a plurality of fuel cells are stacked together in electrical series while being separated by a gas impermeable, electrically conductive bipolar plate. In some instances, the bipolar plate is an assembly formed by securing a pair of thin metal sheets having reactant flow paths formed on their external face surfaces. Typically, an internal coolant flow path is provided between the metal plates of the bipolar plate assembly. Various examples of a bipolar plate assembly of the type used in PEM fuel cells are shown and described in commonly-owned U.S. Pat. No. 5,776,624, the contents of which are hereby incorporated by reference.

Typically, the cooling system associated with a fuel cell stack includes a circulation pump for circulating a liquid coolant through the fuel cell stack to a heat exchanger where the waste thermal energy (i.e., heat) is transferred to the environment. The thermal properties of typical liquid coolants require that a relatively large volume be circulated through the system to reject sufficient waste energy in order to maintain the temperature of the stack within an acceptable range, particularly under maximum power conditions. However, failure of a coolant pump presents significant operating challenges. Currently, when a coolant pump failure is detected, a fuel cell system is generally operated under reduced power conditions to limit heat production until a maximum temperature threshold is exceeded. Once the system temperature has reached maximum allowable levels, the system is shut down. System shut-down may strand the vehicle operator, leading to a walk-home event.

A practical challenge for fuel cell-powered vehicles is maintaining vehicle motive power in the event of a coolant pump failure. A need exists for a fuel cell system that allows for continuous operation of the fuel cell-powered vehicle in the event of a coolant pump failure.

SUMMARY OF THE INVENTION

In view of the above and other problems of the systems and technologies, it is an object of the disclosure to provide a fuel cell-powered vehicle that leverages the expansion and contraction of a volume of coolant within a bipolar plate assembly to pump coolant throughout a cooling system of the fuel cell-powered vehicle, particularly in the event of a coolant pump failure.

In one embodiment, a fuel cell system is provided, the fuel cell system comprising: a fuel cell stack comprising a plurality of fuel cells arranged in a stacked configuration, each fuel cell comprising a bipolar plate assembly comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; and a cooling system configured to place coolant in thermal communication with at least one bipolar plate assembly; wherein cycling pressure differentials between the internal coolant flow path and the first and second reactant gas flow paths cause expansion and contraction of a volume of coolant disposed within the bipolar plate assembly, thereby pumping coolant through the cooling system.

In another embodiment, a method for pumping coolant in a fuel cell system is provided, the method comprising: providing a fuel cell stack comprising a plurality of fuel cells arranged in a stacked configuration, each fuel cell comprising a bipolar plate assembly comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; detecting a coolant pump failure in a cooling system; reducing maximum allowed power generated by the fuel cell stack to a pre-determined limit; and cycling pressure differentials between the internal coolant flow path and the first and second reactant gas flow paths such that expansion and contraction of a volume of coolant disposed within the bipolar plate assembly operates to pump coolant through the cooling system.

In another embodiment, a fuel cell system is provided, the fuel cell system comprising: a fuel cell stack comprising a plurality of fuel cells arranged in a stacked configuration, each fuel cell comprising a bipolar plate assembly comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; and a cooling system configured to place coolant in thermal communication with at least one bipolar plate assembly, wherein the cooling system comprises: a primary system whereby a coolant pump circulates coolant throughout the cooling system; and a backup system whereby cycling pressure differentials between the internal coolant flow path and the first and second reactant gas flow paths cause expansion and contraction of a volume of coolant disposed within the bipolar plate assembly, thereby pumping coolant through the cooling system.

These and other objects, features, embodiments, and advantages will become apparent to those of ordinary skill in the art from a reading of the following detailed description and the appended claims.

DETAILED DESCRIPTION OF THE EMBODIMENTS

The following discussion of the embodiments of the invention directed to methods and systems for cooling a fuel cell-powered vehicle are exemplary in nature and are not intended to limit the invention or the applications and uses thereof.

As used herein, the term "fuel cell" is typically used to refer to either a single cell or a plurality of cells (stack) depending on the context. A plurality of individual cells are typically bundled together to form a fuel cell stack and are commonly arranged in electrical series in a stacked configuration. Each cell within the stack includes the MEA described earlier, and each such MEA provides its increment of voltage.

As used herein, the term "reactant gas" refers to a gas that provides reducing or oxidizing materials to a fuel cell. Embodiments described herein can comprise a first reactant gas and a second reactant gas, corresponding to reactant gases delivered to the anode and cathode of a fuel cell. In certain embodiments, the anode reactant gas is selected from the group consisting of hydrogen or hydrogen-rich gas and the cathode reactant gas is selected from the group consisting of oxygen or oxygen-rich gas, such as air. When the first reactant gas is an anode reactant gas, the second reactant gas is a cathode reactant gas. When the first reactant gas is a cathode reactant gas, the second reactant gas is an anode reactant gas.

The instant embodiments take advantage of the expansion and contraction of a volume of coolant within a bipolar plate assembly due to a difference in pressure between the internal coolant and the external anode and cathode reactant gases in order to pump coolant throughout a cooling system of the fuel cell-powered vehicle in the event of a coolant pump failure.

Figure 1:
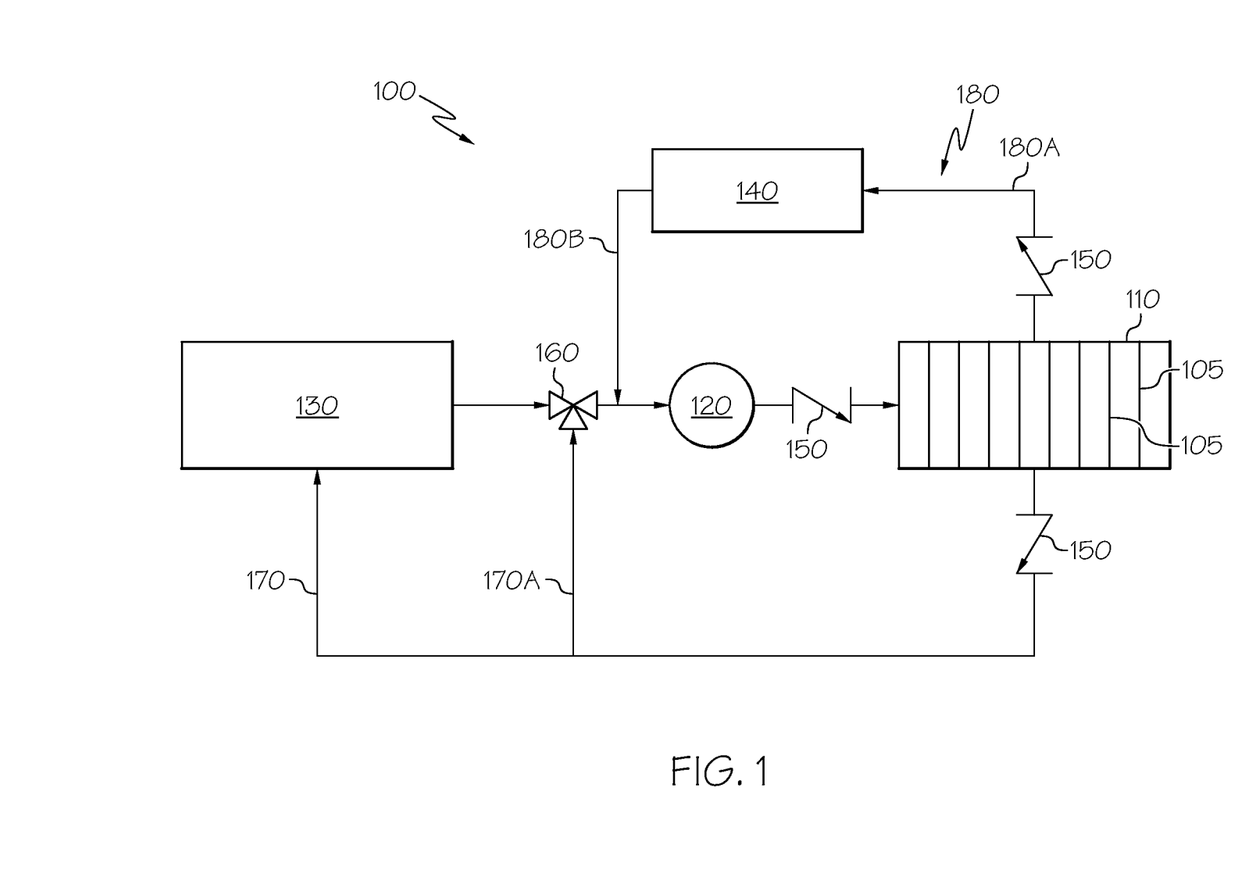
FIG. 1 is a schematic diagram of a system for cooling a fuel cell-powered vehicle, according to an embodiment of the present invention.

FIG. 1 is a schematic diagram of a system 100 for cooling a fuel cell-powered vehicle, according to an embodiment of the present invention. Fuel cell stack 110 comprises a plurality of fuel cells 105, arranged in a stacked configuration. Each fuel cell 105 comprises a bipolar plate assembly (not shown). Fuel cell stack 110 is in fluid communication with radiator 130 by way of coolant loop 170, which generally directs coolant from the fuel cell stack 110 to the radiator 130, and back to the fuel cell stack 110. Coolant pump 120 is disposed along the coolant loop 170 between the radiator 130 and the fuel cell stack 110. In one embodiment, coolant loop 170 comprises a sub-loop 170A, whereby a portion of coolant exhausted from the fuel cell stack 110 bypasses the radiator 130 and is directed to a three-way mixing valve 160 disposed along coolant loop 170 between the radiator 130 and the coolant pump 120. A coolant reservoir 140 is in fluid communication with the fuel cell stack 110 and the coolant loop 170 via coolant reservoir line 180. Coolant reservoir sub-line 180A fluidly connects fuel cell stack 110 and coolant reservoir 140. Coolant reservoir sub-line 180B fluidly connects coolant reservoir 140 and coolant loop 170, wherein sub-line 180B connects to the coolant loop 170 between the radiator 130 and the coolant pump 120. In one embodiment, coolant reservoir sub-line 180B connects to coolant loop 170 between the mixing valve 160 and the coolant pump 120, however one skilled in the art will appreciate that coolant reservoir sub-line 180B can connect to coolant loop 170 at any position upstream of the coolant pump 120.

Coolant reservoir line 180 allows trapped air to be bled to the coolant reservoir 140 after a coolant fill, or whenever air becomes trapped into the system. Line 180 is connected to the highest point of the fuel cell stack 110 in order to function accordingly. The relative diameter of coolant reservoir line 180 is small compared to all other coolant flow lines. During operation, very little (if any) coolant travels through coolant reservoir line 180, but the line allows air to escape back to the coolant reservoir 140.

The system 100 further comprises a plurality of check valves 150 fluidly disposed along coolant loop 170 and coolant reservoir line 180. In one embodiment, a first check valve 150 is fluidly disposed along coolant loop 170 between fuel cell stack 110 and radiator 130 and provides resistance such that coolant exhausted from fuel cell stack 110 is substantially prohibited from flowing back into the fuel cell stack 110; a second check valve 150 is fluidly disposed along coolant loop 170 between coolant pump 120 and fuel cell stack 110 and provides resistance such that coolant exhausted from fuel cell stack 110 is substantially prohibited from flowing back into the coolant pump 120; and a third check valve 150 is fluidly disposed along coolant reservoir line 180A between fuel cell stack 110 and coolant reservoir 140 and provides resistance such that coolant exhausted from fuel cell stack 110 is substantially prohibited from flowing through coolant reservoir line 180A back into coolant reservoir 140 or back into fuel cell stack 110. Thus, the plurality of check valves 150 facilitate pumping of coolant from the fuel cell stack 110, primarily in the direction of the radiator 130. In the event of a coolant pump 120 failure, pressures of anode and cathode reactant gases (hydrogen or hydrogen-rich gas and air or oxygen) supplied to the fuel cell stack 110 are scheduled to cycle relative to the pressure of coolant within the bipolar plate assemblies. In one form, the scheduling may be based on a processor-based controller (not shown) that, upon receipt of a signal from a sensor (not shown), can send a suitable control signal to a compressor, pressure regulator (or other suitable pumping mechanism) in order to control the delivery of reactant gases to the respective side of the MEA. The pressure differential between the reactant gas flow paths on the outside of the bipolar plate assemblies and the coolant disposed within the bipolar plate assemblies causes the plates of the bipolar plate assembly to expand and contract (see FIG. 2, below), thereby pumping coolant throughout the system 100. When pressure of the anode and cathode reactant gases is higher than pressure of coolant within the fuel cell stack 110, the bipolar plate assemblies contract and coolant is exhausted from the fuel cell stack 110, primarily in the direction of the radiator 130. Check valves 150 direct flow of coolant through coolant loop 170 and fuel cell stack 110. In one embodiment, the check valves are spring loaded. Optionally, check valves may be integrated into existing components, such as the coolant pump 120 or fuel cell stack 110.

Figure 2A:
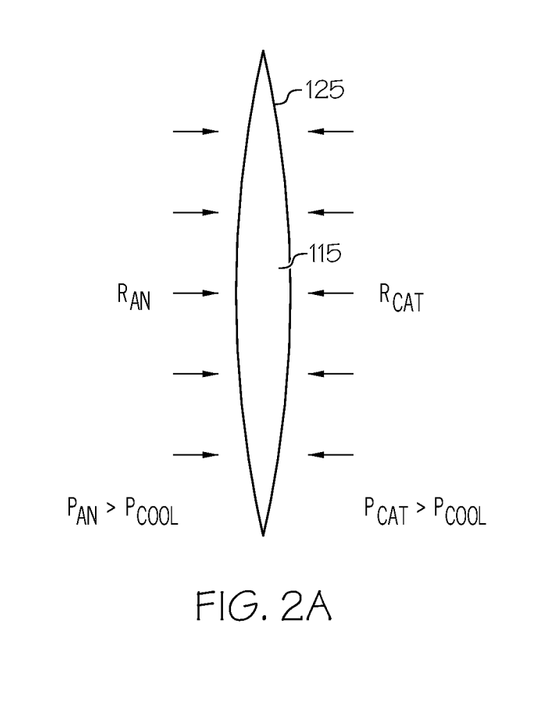
FIG. 2 is a representation of the coolant region within a bipolar plate assembly (A) contracting under conditions whereby pressure of the anode and cathode reactant gases is higher than the pressure of the coolant inside the bipolar plate assembly; and (B) expanding under conditions whereby pressure of the anode and cathode reactant gases is lower than the pressure of the coolant inside the bipolar plate assembly.
Figure 2B:
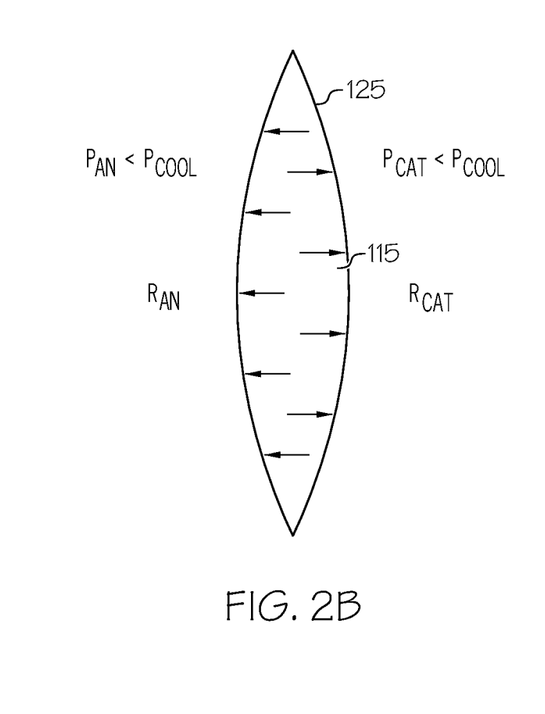

FIG. 2 is a representation of the region of a bipolar plate assembly undergoing expansion and contraction due to reactant gas pressure cycling. In FIG. 2A, the anode ($R_{AN}$) and cathode ($R_{CAT}$) reactant gas flow paths are depicted on external sides of a bipolar plate assembly 125 and coolant 115 is disposed within the bipolar plate assembly 125. When the pressure of each of the anode ($P_{AN}$) and cathode ($P_{CAT}$) reactant gases is higher than the pressure of the coolant 115 ($P_{COOL}$) within the bipolar plate assembly 125, the plates of the bipolar plate assembly 125 contract inward and coolant 115 is exhausted from the bipolar plate assembly. In FIG. 2B, the anode ($R_{AN}$) and cathode ($R_{CAT}$) reactant gas flow paths are depicted on external sides of the bipolar plate assembly 125 and coolant 115 is disposed within the bipolar plate assembly 125. When the pressure of each of the anode ($P_{AN}$) and cathode ($P_{CAT}$) reactant gases is lower than the pressure of the coolant 115 ($P_{COOL}$) within the bipolar plate assembly 125, the plates of the bipolar plate assembly 125 expand outward and coolant 115 is drawn into the bipolar plate assembly 125. In the event of a coolant pump 120 failure, pressure of the anode ($P_{AN}$) and cathode ($P_{CAT}$) reactant gases are scheduled to sequentially cycle such that the higher and lower pressures of the reactant gases relative to the pressure of coolant 115 within the bipolar plate assembly 125 cause the bipolar plate assembly 125 to expand and contract cyclically, thereby pumping coolant 115 through a cooling system. In this way, a fuel cell stack 110 functions as a coolant displacement pump in the event of coolant pump 120 failure.

Figure 3:
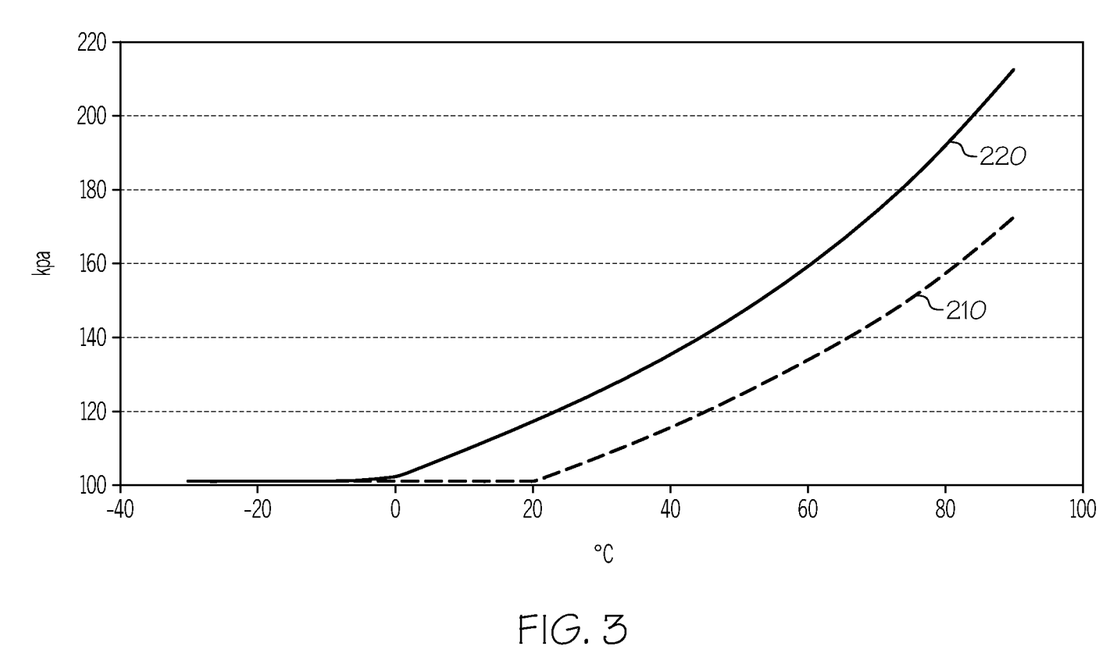
FIG. 3 depicts a representative relationship between absolute coolant pressure (kpa) and system temperature (° C.) due to thermal expansion (dashed line, 210) and plate compression/expansion (solid line, 220) when the coolant pump is not operating.

The cooling system is isolated from and typically operates above ambient pressure, due to thermal expansion of coolant at operating temperature. FIG. 3 depicts a representative relationship between absolute coolant pressure (kpa), system temperature (° C.) due to thermal expansion (dashed line) 210, and stack compression (solid line) 220. As the system temperature increases, coolant pressure increases. The pressure rise is determined by the volume of coolant in the cooling system and gas volume in the coolant reservoir tank. Reactant gas pressure cycling is scheduled, based on a measured system temperature, to achieve pumping within the fuel cell stack and cooling system. For example, maximum reactant gas pressure may be set above the line 220 and minimum reactant gas pressure may be set at or below the line 210. In certain embodiments, a pressure sensor in the coolant system provides feedback control to define reactant gas pressure cycling.

Figure 4:
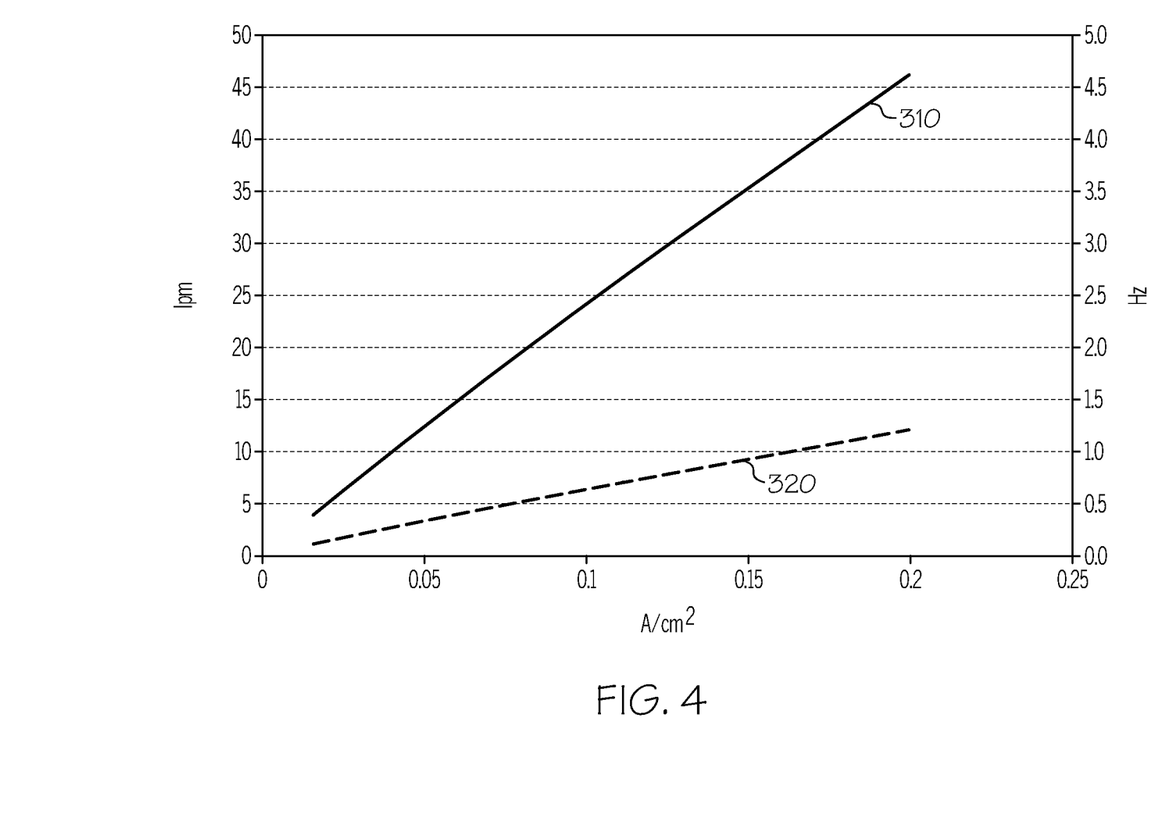
FIG. 4 depicts potential coolant flow rate (lpm) produced relative to current density (A/cm$^2$) and injector frequency (Hz) based on achieving a 50 kpa pressure cycle. Coolant flow is represented by a solid line (310) and injector frequency is represented by a dashed line (320).

The coolant flow rate that can be achieved using the methods and systems provided herein is defined by the rate at which reactant gas pressure is regulated and the rate at which coolant can flow in and out of the fuel cell stack. In certain embodiments, operating conditions will determine the rate of pressure cycling. For example, FIG. 4 depicts the coolant flow rate (lpm) and injector frequency (Hz) that is produced relative to current density (A/cm2) based on achieving a 50 kpa pressure cycle. Coolant flow rate (solid line) is depicted by line 310. Injector frequency (dashed line) is depicted by line 320. The coolant flow rate is sufficient to keep the fuel cell stack from overheating at a reduced level of performance. In certain embodiments, coolant temperature can be monitored to prevent fuel cell stack overheating.

In one embodiment, a fuel cell system is provided, the fuel cell system comprising: a fuel cell stack 110 comprising a plurality of fuel cells 105 arranged in a stacked configuration, each fuel cell 105 comprising a bipolar plate assembly 125 comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; and a cooling system configured to place coolant in thermal communication with at least one bipolar plate assembly 125; wherein cycling pressure differentials between the internal coolant flow path and the first and second reactant gas flow paths cause expansion and contraction of a volume of coolant disposed within the bipolar plate assembly 125, thereby pumping coolant through the cooling system.

In a specific embodiment, the cooling system comprises: a radiator 130 for cooling coolant; a coolant loop 170 configured to place coolant in fluid communication with the fuel cell stack 110 and the radiator 130; a coolant reservoir 140 in fluid communication with the fuel cell stack 110 and the coolant loop 170; and a plurality of check valves 150 fluidly disposed along the coolant loop 170. In a more specific embodiment, the cooling system further comprises a coolant pump 120 in fluid communication with the coolant loop 170, wherein the coolant pump 120 is disposed between the radiator 130 and the fuel cell stack 110.

In a further embodiment, check valves 150 are fluidly disposed such that at least a portion of coolant exhausted from the fuel cell stack 110 is directed to the radiator 130 for cooling. The plurality of check valves 150 are positioned such that, upon cyclic expansion and contraction of the bipolar plate assemblies 125 within the fuel cell stack 110, coolant is pumped throughout the cooling system. In one embodiment, the fuel cell system comprises a first check valve 150 fluidly disposed between the fuel cell stack 110 and the coolant pump 120, such that coolant exhausted from the fuel cell stack 110 is substantially prohibited from flowing back into the coolant pump 120. In a further embodiment, the fuel cell system further comprises a second check valve 150 fluidly disposed between the fuel cell stack 110 and the radiator 130, such that coolant exhausted from the fuel cell stack 110 is substantially prohibited from flowing back to the fuel cell stack 110. In a further embodiment, the fuel cell system comprises a third check valve 150 fluidly disposed between the fuel cell stack 110 and the coolant reservoir 140, such that coolant exhausted from the fuel cell stack 110 is substantially prohibited from flowing back to the fuel cell stack 110. The plurality of check valves 150 function to direct coolant exhausted from the fuel cell stack 110 in the general direction of the radiator 130.

In another embodiment, the fuel cell system comprises a three-way mixing valve 160 configured to control coolant flow in the cooling system between the sub-loop 170A, the radiator 130, and the fuel cell stack 110.

In another embodiment, the fuel cell system further comprises a temperature sensor (not shown) for sensing the temperature of coolant inside the cooling system, wherein an increase in coolant temperature within the cooling system correlates to an increase in coolant pressure within the cooling system. One skilled in the art will appreciate that the sensor can be located at a variety of positions throughout the cooling system, in order to monitor the temperature of coolant therein. For example, in one embodiment, the temperature sensor is located at an inlet of the fuel cell stack 110.

In another embodiment, the fuel cell system further comprises a pressure regulator (not shown) for regulating pressure of the first and second reactant gas flow paths, wherein the pressure regulator operates to schedule pressure cycling of the first and second reactant gas flow paths based on the temperature of coolant within the cooling system. The pressure regulator can be either passive or active in nature. For example, in one embodiment the pressure regulator is a passive spring or force-balance diaphragm control. In another embodiment, the pressure regulator is an active processor-based controller that, upon receipt of a signal from a sensor, can send a suitable control signal to a compressor, injector, or other suitable pumping mechanism in order to control the delivery of reactant gases to the fuel cell 110. One skilled in the art will appreciate that the pressure regulator can be located at a variety of positions throughout the fuel cell system, in order to regulate pressure of the first and second reactant gases. In one embodiment, the pressure regulator is located at an inlet of the reactant gas flow paths into the fuel cell stack 110.

In another embodiment, the fuel cell system further comprises a pressure sensor (not shown) for sensing the pressure of coolant within the cooling system, wherein the pressure sensor operates as a feedback control for scheduling pressure cycling of the first and second reactant gas flow paths. One skilled in the art will appreciate that the sensor can be located at a variety of positions throughout the cooling system, in order to monitor the pressure of coolant therein. For example, in one embodiment, the pressure sensor is located at an inlet of the fuel cell stack 110.

In another embodiment, a vehicle is provided, comprising any of the fuel cell system embodiments described herein.

In another embodiment, a method for pumping coolant in a fuel cell system is provided, the method comprising: providing a fuel cell stack 110 comprising a plurality of fuel cells 105 arranged in a stacked configuration, each fuel cell comprising a bipolar plate assembly 125 comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; detecting a coolant pump 120 failure in a cooling system; reducing maximum allowed power generated by the fuel cell stack 110 to a pre-determined limit; and cycling pressure differentials between the internal coolant flow path and the first and second reactant gas flow paths such that expansion and contraction of a volume of coolant disposed within the bipolar plate assembly 125 operate to pump coolant 115 through the cooling system.

In another embodiment, the method further comprises the step of monitoring coolant temperature within the cooling system to ensure coolant flow rate is sufficient to prohibit overheating of the fuel cell stack 110.

In another embodiment, the method further comprises the step of monitoring coolant pressure within the cooling system. In another embodiment, the method further comprises the step of scheduling pressure differential cycles based on coolant pressure detected within the cooling system.

In a more specific embodiment, cycling pressure differentials comprises the steps of: (a) reducing pressure of the first and second reactant gas flow paths relative to the internal coolant flow path, thereby causing the first and second plates to expand outward and increase the volume of coolant 115 disposed within the bipolar plate assembly 125; (b) increasing pressure of the first and second reactant gas flow paths relative to the internal coolant flow path, thereby causing the first and second plates to contract inward and decrease the volume of coolant 115 disposed within the bipolar plate assembly 125; and (c) sequentially repeating steps (a) and (b), thereby pumping coolant 115 through the coolant system. In one embodiment, cycling pressure differentials comprises cyclically reducing and increasing a frequency of actuating injectors of the first and second reactant gas flow paths into the fuel cell stack 110. In another embodiment, cycling pressure differentials comprises cyclically reducing and increasing a duty cycle of injectors of the first and second reactant gas flow paths into the fuel cell stack 110.

In another embodiment, a fuel cell system is provided, the fuel cell system comprising: a fuel cell stack 110 comprising a plurality of fuel cells 105 arranged in a stacked configuration, each fuel cell comprising a bipolar plate assembly 125 comprising: a first plate and a second plate having an internal coolant flow path disposed therebetween; a flow path for a first reactant gas on a side of the first plate opposite the internal coolant flow path; and a flow path for a second reactant gas on a side of the second plate opposite the internal coolant flow path; and a cooling system configured to place coolant 115 in thermal communication with at least one the bipolar plate assembly 125, wherein the cooling system comprises: a primary system whereby a coolant pump 120 circulates coolant 115 throughout the cooling system; and a backup system whereby cycling pressure differentials between the internal coolant flow path and the first and second reactant gas flow paths cause expansion and contraction of a volume of coolant 115 disposed within the bipolar plate assembly 125, thereby pumping coolant 115 through the cooling system. In a more specific embodiment, the cooling system comprises: a radiator 130 for cooling coolant 115; a coolant pump 120 for circulating coolant 115; a coolant loop 170 configured to place coolant in fluid communication with the fuel cell stack 110, the coolant pump 120, and the radiator 130; a coolant reservoir 140 in fluid communication via coolant reservoir line 180 with the fuel cell stack 110 and the coolant loop 170; and a plurality of check valves 150 fluidly disposed along the coolant loop 170 and the coolant reservoir line 180.

As in the embodiments disclosed above, check valves 150 are fluidly disposed such that at least a portion of coolant exhausted from the fuel cell stack 110 is directed to the radiator 130 for cooling. The plurality of check valves 150 are positioned such that, upon cyclic expansion and contraction of the bipolar plate assemblies 125 within the fuel cell stack 110, coolant 115 is pumped throughout the cooling system. In one embodiment, the fuel cell system comprises a first check valve 150 fluidly disposed between the fuel cell stack 110 and the coolant pump 120, such that coolant 115 exhausted from the fuel cell stack 110 is substantially prohibited from flowing back into the coolant pump 120. In a further embodiment, the fuel cell system further comprises a second check valve 150 fluidly disposed between the fuel cell stack 110 and the radiator 130, such that coolant exhausted from the fuel cell stack 110 is substantially prohibited from flowing back to the fuel cell stack 110. In a further embodiment, the fuel cell system comprises a third check valve 150 fluidly disposed between the fuel cell stack 110 and the coolant reservoir 140, such that coolant exhausted from the fuel cell stack 110 is substantially prohibited from flowing back to the fuel cell stack 110. The plurality of check valves 150 function to direct coolant 115 exhausted from the fuel cell stack 110 in the general direction of the radiator 130.

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

We claim:

1. A fuel cell system comprising:
    a fuel cell stack comprising a plurality of fuel cells arranged in a stacked configuration, each fuel cell comprising a bipolar plate assembly comprising:
        a first plate and a second plate having an internal coolant flow path disposed therebetween;
        a flow path for a first reactant gas on a side of the first plate opposite said internal coolant flow path; and
        a flow path for a second reactant gas on a side of the second plate opposite said internal coolant flow path;
    a pressure regulator configured to regulate pressure of said first and second reactant gas flow paths, wherein said pressure regulator is configured to schedule pressure cycling of said first and second reactant gas flow paths; and
    a cooling system configured to place coolant in thermal communication with at least one said bipolar plate assembly, wherein said cooling system comprises:
        a primary system comprising a coolant pump that circulates coolant through said cooling system; and
        a backup system configured to be actuated in the event of coolant pump failure, wherein cycling pressure differentials between said internal coolant flow path and said first and second reactant gas flow paths cause expansion and contraction of a volume of coolant disposed within said bipolar plate assembly, thereby pumping coolant through said cooling system in the event of coolant pump failure.

2. The fuel cell system of claim 1, wherein said cooling system comprises:
    a radiator for cooling coolant;
    a coolant loop configured to place coolant in fluid communication with said fuel cell stack and said radiator;
    a coolant reservoir in fluid communication with said fuel cell stack and said coolant loop; and
    a plurality of check valves fluidly disposed along said coolant loop.

3. The fuel cell system of claim 2, further comprising a temperature sensor for sensing the temperature of coolant inside said cooling system, wherein an increase in coolant temperature within said cooling system correlates to an increase in coolant pressure within said cooling system.

4. The fuel cell system of claim 3, wherein said pressure regulator schedules pressure cycling of said first and second reactant gas flow paths based on the temperature of coolant within said cooling system.

5. The fuel cell system of claim 4, further comprising a pressure sensor for sensing the pressure of coolant within said cooling system, wherein said pressure sensor operates as a feedback control for scheduling pressure cycling of said first and second reactant gas flow paths.

6. The fuel cell system of claim 2, wherein check valves are fluidly disposed such that at least a portion of coolant exhausted from said fuel cell stack is directed to said radiator for cooling.

7. The fuel cell system of claim 2, wherein said coolant pump is in fluid communication with said coolant loop, and wherein said coolant pump is disposed between said radiator and said fuel cell stack.

8. The fuel cell system of claim 7, wherein said plurality of check valves comprises a first check valve fluidly disposed between said fuel cell stack and said coolant pump, such that coolant exhausted from said fuel cell stack is substantially prohibited from flowing back to said coolant pump.

9. The fuel cell system of claim 8, wherein said plurality of check valves comprises a second check valve fluidly disposed between said fuel cell stack and said radiator, such that coolant exhausted from said fuel cell stack is substantially prohibited from flowing back to said fuel cell stack.

10. The fuel cell system of claim 9, wherein said plurality of check valves comprises a third check valve fluidly disposed between said fuel cell stack and said coolant reservoir, such that coolant exhausted from said fuel cell stack is substantially prohibited from flowing back to said fuel cell stack and said coolant reservoir.

11. A vehicle comprising the fuel cell system of claim 1.

12. A method for pumping coolant in a fuel cell system, the method comprising:
    providing a fuel cell system comprising:
        a fuel cell stack comprising a plurality of fuel cells arranged in a stacked configuration, each fuel cell comprising a bipolar plate assembly comprising:
            a first plate and a second plate having an internal coolant flow path disposed therebetween;
            a flow path for a first reactant gas on a side of the first plate opposite said internal coolant flow path; and
            a flow path for a second reactant gas on a side of the second plate opposite said internal coolant flow path;
        a pressure regulator configured to regulate pressure of said first and second reactant gas flow paths, wherein said pressure regulator is configured to schedule pressure cycling of said first and second reactant gas flow paths; and
        a cooling system configured to place coolant in thermal communication with at least one said bipolar plate assembly, wherein said cooling system comprises:
            a primary system comprising a coolant pump that circulates coolant through said cooling system; and
            a backup system configured to be actuated in the event of coolant pump failure;
    detecting a coolant pump failure in a cooling system;
    reducing maximum allowed power generated by said fuel cell stack to a pre-determined limit; and
    cycling pressure differentials between said internal coolant flow path and said first and second reactant gas flow paths such that expansion and contraction of a volume of coolant disposed within said bipolar plate assembly operates to pump coolant through said cooling system.

13. The method of claim 12, further comprising the step of monitoring coolant temperature within said cooling system to ensure coolant flow rate is sufficient to prohibit overheating of said fuel cell stack.

14. The method of claim 12, further comprising the step of monitoring coolant pressure within said cooling system.

15. The method of claim 14, further comprising the step of scheduling pressure differential cycles based on coolant pressure within said cooling system.

16. The method of claim 12, wherein cycling pressure differentials comprises the steps of:
   (a) reducing pressure of said first and second reactant gas flow paths relative to said internal coolant flow path, thereby causing said first and second plates to expand outward and increase the volume of coolant disposed within said bipolar plate assembly;
   (b) increasing pressure of said first and second reactant gas flow paths relative to said internal coolant flow path, thereby causing said first and second plates to contract inward and decrease the volume of coolant disposed within said bipolar plate assembly; and
   (c) sequentially repeating steps (a) and (b), thereby pumping coolant through said coolant system.

17. The method of claim 12, wherein cycling pressure differentials comprises cyclically reducing and increasing a frequency of actuating injectors of said first and second reactant gas flow paths into said fuel cell stack.

18. The method of claim 12, wherein cycling pressure differentials comprises cyclically reducing and increasing a duty cycle of injectors of said first and second reactant gas flow paths into said fuel cell stack.

* * * * *